United States Patent [19]

Naarmann et al.

[11] 3,943,195

[45] Mar. 9, 1976

[54] SELF-EXTINGUISHING THERMOPLASTIC MOLDING MATERIAL

[75] Inventors: Herbert Naarmann, Wattenheim; Klaus Penzien, Ludwigshafen, both of Germany

[73] Assignee: BASF Aktiengesellschaft, Ludwigshafen (Rhine), Germany

[22] Filed: Nov. 21, 1974

[21] Appl. No.: 525,822

[30] Foreign Application Priority Data

Nov. 26, 1973 Germany............................ 2358855

[52] U.S. Cl......... 260/874; 260/897 C; 260/45.7 R; 260/DIG. 24
[51] Int. Cl.²......................................... C08L 25/06
[58] Field of Search...260/897, 874, 45.7 R, DIG. 24

[56] References Cited
UNITED STATES PATENTS

| | | | |
|---|---|---|---|
| 3,093,599 | 6/1963 | Tamm et al.................. | 260/DIG. 24 |
| 3,441,524 | 4/1969 | Burger et al. .............. | 260/45.7 R X |
| 3,457,204 | 7/1969 | Burger et al. .............. | 260/45.7 R X |
| 3,635,850 | 1/1972 | Birkner et al................ | 260/DIG. 24 |

*Primary Examiner*—Carman J. Seccuro
*Attorney, Agent, or Firm*—Johnston, Keil, Thompson & Shurtleff

[57] ABSTRACT

Thermoplastic molding material based on styrene polymers and olefin polymers which have been flameproofed with an organic bromine compound. Brominated oligomers or polymers of dialkylbenzenes, trialkylbenzenes or tetraalkylbenzenes serve as flameproofing agents. The molding material may be processed into self-extinguishing moldings.

5 Claims, No Drawings

SELF-EXTINGUISHING THERMOPLASTIC MOLDING MATERIAL

This application discloses and claims subject matter described in German Patent Application P 2358855.8, filed Nov. 26, 1973, which is incorporated herein by reference.

The invention relates to self-extinguishing thermoplastic molding material based on styrene polymers and olefin polymers which contain brominated oligomers or polymers of dialkylbenzenes, trialkylbenzenes or tetraalkylbenzenes as flameproofing agents.

Substances containing bromine have proved to be suitable as flameproofing agents for thermoplastics. It is known from German Printed Application (DAS) No. 1,255,302 that oligomers and polymers of diisopropylbenzene act as synergists with bromine compounds in flameproofing thermoplastics. Peroxides and azo compounds have a similar effect.

In all these cases a fairly large amount of bromine has to be incorporated into the plastics in order to achieve adequately short extinction times.

The invention therefore has as an object the provision of a flameproofing agent which results in short extinction times even at low concentrations of bromine in the plastics. Another object of the invention is to decrease the number of chemical reagents required for flameproofing.

This object is achieved by a thermoplastic molding material based on a styrene polymer or an olefin polymer having a content of from 0.5 to 10% by weight of a flameproofing agent comprising a brominated oligomer or polymer of a dialkylbenzene, trialkylbenzene or tetraalkylbenzene having a degree of polymerization of from 2 to 200.

Particularly suitable polyolefins are polyethylene, polypropylene, polyisobutylene and a copolymer of ethylene and propylene; suitable styrene polymers include polystyrene, impact-resistant polystyrene containing from 2 to 10% by weight of a rubber, for example polybutadiene, copolymers of styrene with up to 50% by weight of α-methylstyrene, acrylonitrile or methyl methacrylate and the impact-resistant modified copolymers which generally contain from 5 to 40% of a polybutadiene rubber or a polyacrylate rubber. Polymers containing expanding agents and which are suitable for the production of self-extinguishing expanded products have particular importance. They contain an expanding agent in addition to the flameproofing agent. Solid expanding agents, as for example sodium hydrogen carbonate, azodicarboxamide or azodiisobutyronitrile may be used, preferably in an amount from 0.1 to 5% by weight, or liquid or gaseous expanding agents may be used, as for example propane, butane, pentane, hexane, methyl chloride or dichlorodifluoromethane, preferably in an amount of from 2 to 10% by weight.

The thermoplastic molding material contains from 0.5 to 10% and preferably from 1 to 5% by weight of flameproofing agent.

The flameproofing agents used according to the invention are brominated oligomers or polymers of dialkylbenzenes, trialkylbenzenes or tetraalkylbenzenes having a degree of polymerization of from 2 to 200 and preferably from 2 to 50. A detailed description of the starting materials for bromination applicable in the present context will be found in German Printed Application (DAS) No. 1,255,302 which is incorporated herein by reference. These are oligomers or polymers of compounds of the general formula:

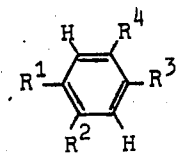

in which at least two of the substituents $R^1$, $R^2$, $R^3$ and $R^4$ represent the grouping:

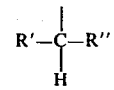

the remaining substituents being hydrogen; $R'$ and $R''$ may each be n-alkyl or $R''$ may be hydrogen; or mixtures of these compounds with those of the same general formula in which $R^1$ is the grouping

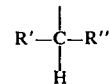

and the other substituents are hydrogen.

Oligomers or polymers of halogen-substituted dialkylbenzenes, trialkylbenzenes or tetraalkylbenzenes may also be used as synergists for the organic bromine compounds according to the said print. These compounds differ from the flameproofing agents according to this invention in that they are prepared by polymerization of halo-substituted compounds, for example of 1,4-diisopropyl-2,5-dichlorobenzene, whereas according to this invention substances are used which have not been brominated until after they have been oligomerized or polymerized. When an attempt is made to adopt the converse method in the case of bromine-substituted compounds it is found that decomposition with the formation of hydrogen bromide takes place during the oligomerization or polymerization.

Polymerized hydrocarbons are also disclosed in German Laid-Open Specification (DOS) No. 2,050,009. They are generally prepared by Wurtz-Fittig reactions or by polyrecombination reactions as described by V. V. Korshak, J. Polym. Sci. USSR, Vol. 1 (1960), page 341 and Vol. 3 (1962) page 925. The simplest substance in this class (dicumyl) may also be used.

Particularly preferred oligomers include those of diisopropylbenzene having a degree of polymerization of from 3 to 30 such as are disclosed in German Patent Application P2338709 which is also incorporated herein by reference. These oligomers are prepared from a mixture of isomers of diisopropylbenzene which preferably contains about 60% of meta-isomers and 30% of para-isomers.

Bromination of the oligomers or polymers is carried out by a conventional method, for example by reaction with elementary bromine (either without a solvent or dissolved in carbon tetrachloride, methylene chloride, glacial acetic acid or petroleum ether) at from 30° to 80°C; catalysts such as iron powder or a mixture of iron powder and iodine may be added.

The flameproofing agent should have a bromine content of from about 20 to 80% and preferably from 25 to 70% by weight. Other flameproofing agents, for example antimony trioxide or phosphorus compounds may be present in addition to the bromine compounds.

In addition to the flameproofing agents according to the invention and the expanding agents already mentioned the thermoplastic molding material may also contain other additives, as for example stabilizers, fillers, plastics, pigments, lubricants, plasticizers or antistatic agents. Incorporation of the additives into the thermoplastics is carried out conventionally, preferably by addition to the molten plastics, for example in an extruder, kneader or roller. The thermoplastic molding material may be processed into self-extinguishing moldings.

The following Examples illustrate the invention.

The parts and percentages specified in the Examples are by weight.

To test expanded materials a molding having the dimensions 0.5 cm × 15 cm × 40 cm is held for five seconds in a gas flame having a flame height of 40 mm and the flame is then removed with a gentle movement. The time after removal from the flame before extinction takes place is a measure of the flame resistance. Molding materials which have been given an inadequate self-extinguishing finish or none at all burn up completely after removal from the flame.

EXAMPLE 1

Flameproofed test specimens of expanded polystyrene having the dimensions 0.5 cm × 15 cm × 40 cm are prepared as described in German Printed Application (DAS) No. 1,255,302. The flameproofing agent and synergist used are reaction products from the reaction of oligomerized mixtures of diisopropylbenzene mixtures (mean degree of polymerization from 6 to 7) with increasing amounts of bromine. The extinction times in the burning tests 1 to 4 are given in the following Table as a function of the bromine content of the flame-proofing agent which is added in an amount of 1%.

| Experiment No. | 1 | 2 | 3 | 4 |
|---|---|---|---|---|
| % $Br_2$ in the flameproofing agent | 28 | 42 | 51 | 62 |
| Extinction time in seconds | 0.8 | 0.6 | 0.5 | 0.4 |

EXAMPLE 2

Production and testing of the expanded polystyrene specimens are carried out as described in Example 1 but graduated amount of a brominated oligodiisopropylbenzene isomer mixture ($n = 6$) having a bromine content of 62% are used.

| Test No. | % of brominated oligodiisopropylbenzene isomer mixture | Extinction time in seconds |
|---|---|---|
| 5 | 0.2 | 19 |
| 6 | 0.4 | 3.4 |
| 7 | 0.6 | 1.1 |
| 8 | 0.8 | 0.70 |
| 9 | 1.0 | 0.40 |
| 10 | 1.2 | 0.25 |
| 11 | 1.4 | 0.2 |
| 12 | 1.6 | ~0.1 |
| 13 | 1.8 | ~0.1 |
| 14 | 2.0 | <0.1 |

Comparison Examples A and B

A. 1% of hexabromocyclododecane (bromine content about 73%) is used as flameproofing agent in combination with 0.2% of oligodiisopropylbenzene isomer mixture as synergist and tested in the same method as in Examples 1 to 14. The extinction time is 0.74 second. Comparison with experiment 10 shows that (at about the same bromine content of the specimen product (0.73% as against 0.74%) ) the extinction times with the brominated oligodiisopropylbenzene isomer mixture are about three times as short.

B. Comparison with test 8 similarly reveals that the same extinction times are achieved when using only 0.8% of oligodiisopropylbenzene isomer mixture. This means a decrease in the amount of bromine required in the test specimen from 0.73% to 0.50%.

EXAMPLE 3

1% of antimony trioxide and also various bromine compounds are added to polypropylene from which moulded articles are prepared having the dimensions 12.7 cm × 1.27 cm × 0.16 cm. These are kept at 70°C for seven days.

The burning test is carried out according to the UL standard: each specimen is held in a flame twice, each time for five seconds (in the case of five test specimens = ten exposures to the flame, the total extinction times should not exceed 250 seconds).

The following bromine compounds were used:
a. 2% of hexabromocyclodoecane
b. 1.7% of hexabromocyclododecane (equivalent to 1.2% of bromine) + 0.2 % of oligomeric diisopropylbenzene ($n = 6$)
c. 2% of brominated oligomeric diisopropylbenzene ($n = 6$) having a bromine content of 62% (equivalent to 1.2% of bromine).

| Test | Extinction time (mean of ten flame exposures) |
|---|---|
| (a) | 37 seconds |
| (b) | 15 seconds |
| (c) | 4 seconds |

We claim:

1. A thermoplastic molding material based on a styrene polymer or olefin polymer which has a content of from 0.5 to 10% by weight of a flameproofing agent consisting of a brominated oligomer or polymer of a dialkylbenzene, a trialkylbenzene or a tetraalkylbenzene of a degree of polymerization of from 2 to 200.

2. A thermoplastic molding material as claimed in claim 1 which has a content of from 1 to 5% by weight of the flameproofing agent.

3. A thermoplastic molding material as claimed in claim 1 wherein the degree of polymerization of the oligomer or polymer is from 2 to 50.

4. A thermoplastic molding material as claimed in claim 1 wherein the flameproofing agent has a bromine content of from 20 to 80% by weight.

5. A thermoplastic molding material as claimed in claim 1 wherein the flameproofing agent has a bromine content of from 25 to 70% by weight.

* * * * *